United States Patent

Vaynshteyn

[11] Patent Number: 5,486,886
[45] Date of Patent: Jan. 23, 1996

[54] VARIABLE ANGLE FLASH WITH LINEAR MOTOR DRIVE

[75] Inventor: Mikhail Vaynshteyn, Rochester, N.Y.

[73] Assignee: Eastman Kodak Company, Rochester, N.Y.

[21] Appl. No.: 210,984

[22] Filed: Mar. 21, 1994

[51] Int. Cl.[6] .................................................. G03B 15/05
[52] U.S. Cl. ........................ 354/149.1; 362/18; 362/285
[58] Field of Search .......................... 354/149.1; 362/18, 362/285, 286

[56] References Cited

U.S. PATENT DOCUMENTS

| | | |
|---|---|---|
| 3,839,632 | 10/1974 | Fedrico . |
| 4,023,888 | 5/1977 | Klaenhammer et al. . |
| 4,462,666 | 7/1984 | Orban . |
| 4,821,053 | 4/1989 | Dowe et al. . |
| 4,914,461 | 4/1990 | Hori . |
| 4,935,759 | 6/1990 | Tsuji et al. . |
| 5,036,402 | 7/1991 | Shiota . |
| 5,050,044 | 9/1991 | Shibayama ................................ 362/18 |
| 5,126,778 | 6/1992 | Wheeler et al. . |

FOREIGN PATENT DOCUMENTS 2230131  9/1990  Japan .

OTHER PUBLICATIONS

New Type Ultrasonic Motor; Techno Japan, vol. 19—No. 5, May 1986, pp. 67–69.
New Ideas in Motion; PCIM, Apr. 1987, pp. 37–39.
Akiyama, Dr. Yuji; Present State of Ultrasonic Motors in Japan; Journal of Electrical Engineering (JEE), Apr. 1987, pp. 76–80, Dempa Publications, N.Y.
Ise. Yukihiko; Traveling Wave Ultrasonic Motors Offer High Conversion Efficiency. (Date Unknown).
Ultrasonic Motor, 17 pages, (Author and Date unknown).

Primary Examiner—A. A. Mathews
Attorney, Agent, or Firm—Peter J. Bilinski

[57] ABSTRACT

A variable angle flash for a photographic camera has a flash tube and a reflector that are relatively movable along an optical axis. A linear motor in the camera drives a follower connected with one of the flash tube and reflector members for moving the flash tube (or reflector) along the axis to vary the illumination angle of the flash. Optionally, the motor is a linear form of ultrasonic wave motor of which the follower forms a movable portion. An elastic body engaging the follower and fixed to the camera case carries piezoelectric elements that undulate the body when subjected to ultrasonic alternating currents, causing the body to move the follower and drive the flash tube (or reflector) along the optical axis and thereby vary the illumination angle.

9 Claims, 2 Drawing Sheets

VARIABLE ANGLE FLASH WITH LINEAR MOTOR DRIVE

FIELD OF THE INVENTION

This invention relates to flash illumination devices for photographic cameras and, in particular, to flash devices with a variable illumination angle, primarily for use with zoom lens cameras.

BACKGROUND OF THE INVENTION

It is known in the art relating to zoom lens and other cameras having a variable field of view to provide a flash illumination source or strobe light having a variable illumination angle. The flash source may be coupled with the lens zoom control to vary the field illuminated to match the instantaneous field of view of the lens, or the illumination angle may be separately controlled. Of various means for varying the illumination angle, one known means provides for moving the relative positions of the light source and an associated reflector along an optical axis. However, the mechanisms involved are relatively complicated and bulky for camera flash use.

SUMMARY OF THE INVENTION

The present invention solves the above problem by providing a variable angle flash apparatus for a photographic camera comprising a light source member and a reflector member which are relatively movable along an optical axis for focusing light from said source with a desired illumination angle and means for varying the distance along said axis between said light source and said reflector for changing said illumination angle, which is characterized in that:

said means for varying the distance between said light source and said reflector includes a follower connected with one of said light source and reflector member, said follower being movable along a linear path parallel with said optical axis for moving said one member relative to the other member along said axis, said follower being connected with a movable part of a linear motor having a second part fixed with respect to said other of the light source and reflector members, said linear motor being operative when energized to move said follower along said linear path, thereby varying the distance between the light source and reflector members and changing the illumination angle of the flash.

The present invention provides a relatively simple and compact variable angle flash device in which the relative positions of a light source and an associated reflector are varied along an optical axis by means of a linear motor reciprocal in a direction parallel with the axis. In a particular embodiment, the motor is a type of wave friction drive motor known as an ultrasonic motor. This motor represents a new linear form of a known rotary ultrasonic traveling wave motor in which a rotor is driven by surface motion of an elastic stator body. The motion is caused by ultrasonic vibrations of the body produced by alternately inverted piezoelectric elements bonded to an opposite surface of the body and producing undulations in the body when subjected to alternating current charges.

The linear motor drive simplifies the flash device by reducing the number of parts and providing a more compact unit adapted for camera application.

These and other features and advantages of the invention will be more fully understood from the following detailed description of the invention taken together with the accompanying drawings.

DETAILED DESCRIPTION OF THE INVENTION

Figure 1:
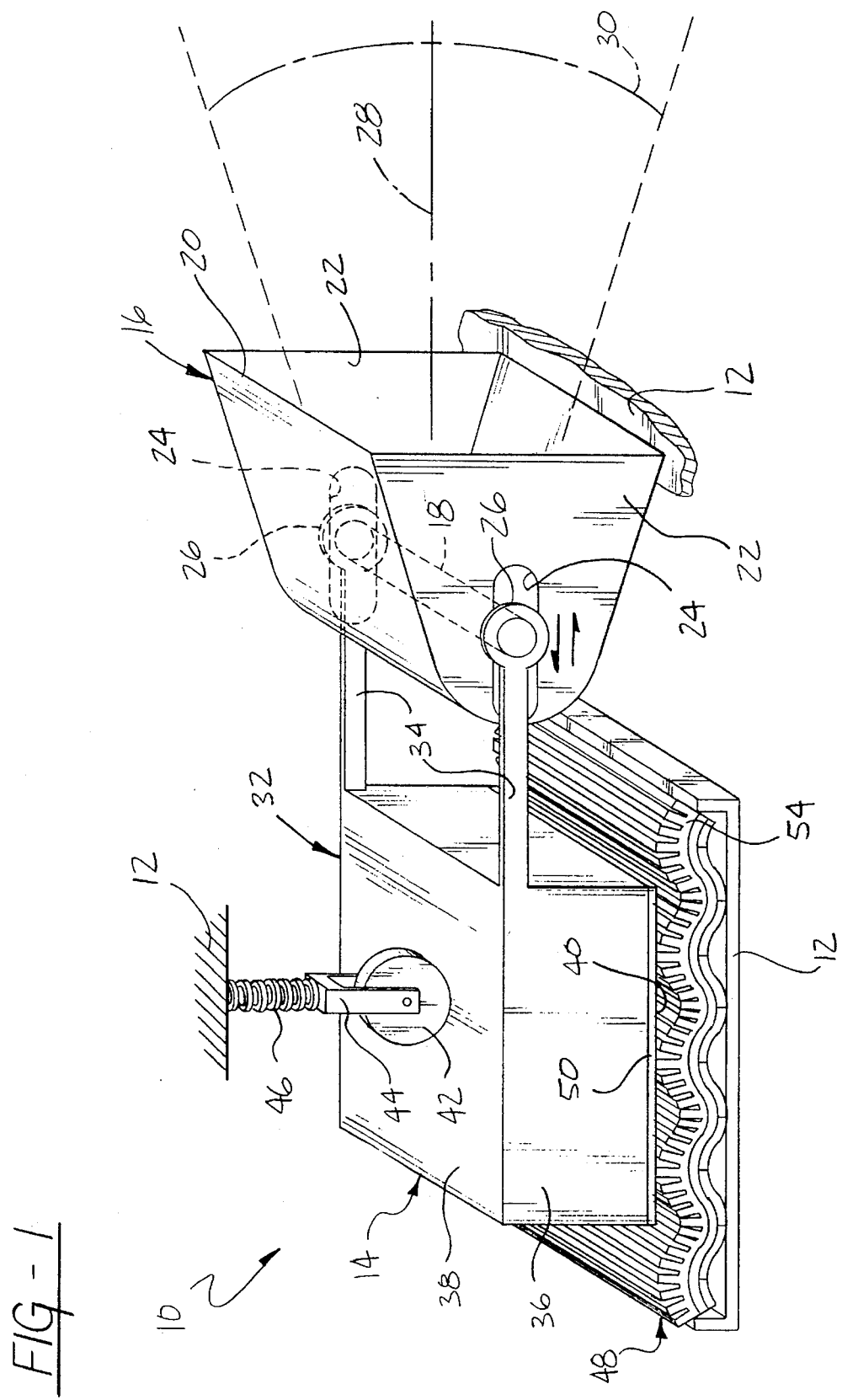
FIG. 1 is a schematic perspective view of a variable angle flash device according to the invention.
Figure 2:
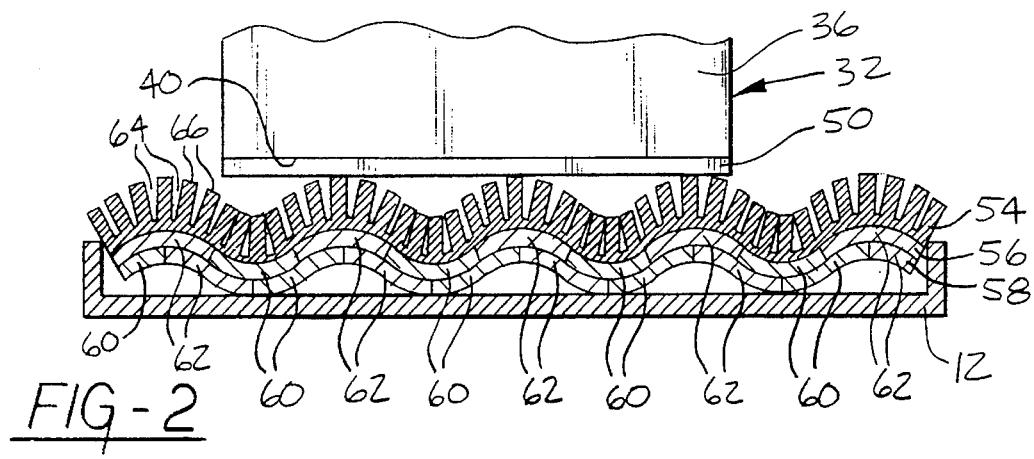
FIG. 2 is an enlarged schematic side view of an ultrasonic linear motor used in the flash device of FIG. 1.

Referring now to the drawings in detail, numeral 10 generally indicates a portion of a photographic camera having a case 12 enclosing a variable illumination angle flash 14. Flash 14 includes a reflector 16 enclosing a flash tube 18 which acts as a light source for illuminating the subjects of photographs taken by the camera.

The reflector 16 is formed from a curved sheet 20 having a trough shape and having flat sides 22 enclosing the edges of the sheet 20. Slots 24 in the sides 22 receive sockets 26 supporting the flash tube 18 which extends between the sides 22 within the reflector 16. The flash tube 18 and the reflector 16 are symmetrically disposed about an optical axis 28 which defines the center of an illumination angle 30 defining the upper and lower edges of a pattern of light projected by the flash device. The reflector 16 and tube 18 are relatively movable along the axis 28 to vary the angle of illumination 30 within a predetermined range. In the embodiment illustrated, the reflector is fixed within the case 12 and the tube 18 is movable along the axis 28 by moving the sockets 26 longitudinally within the slots 24 which extend parallel with the axis 28.

The sockets 26 are supported by a flash holder or follower 32 including a pair of arms 34 extending longitudinally from a flash holder body 36 having a generally flat top 38 and bottom 40 parallel with the axis 28. The top 38 is engaged by biasing means such as a roller 42 supporting a fork 44 biased downward by a spring 46 grounded to the camera case 12.

The follower 32 forms a movable portion of an ultrasonic linear motor 48. The flat bottom 40 is provided with a friction material 50 which is engaged by a stator 52 of the motor 48. The stator 52 is fixed to the camera case 12 and includes an elastic body 54 against which are stacked and bonded a first layer 56 and a second layer 58 of piezoelectric ceramic elements 60, 62. The elements 60, 62 are longitudinally alternately arranged in each layer 56, 58 and are offset longitudinally by half their length in the two stacked layers 56, 58. The elements are identical except that the alternate elements 62 are mounted inverted with respect to the elements 60. The elastic body 54 may be a flexible metal sheet or, as shown, a plate having lateral grooves 64 across the upper portion to maintain flexibility and form protruding fingers 66. The upper ends of the fingers 66 engage the friction material 50 of the follower bottom 40.

To operate the linear motor an electronic system is required, which may be the same as is used in known ultrasonic rotary motors. The electronic system operates to impose alternating electrical voltage charges of ultrasonic frequency upon the layers of ceramic elements 60, 62. The phasing of the alternating voltage charges in the first layer 56 is advanced or retarded by a half cycle or 90 degrees from that of the second layer 58. As each layer 56, 58 reaches the peak of its voltage charge, the alternate piezoelectric elements elongate or contract depending upon the direction of the voltage charge and their standard or inverted mounting. The alternate elongation and contraction of the longitudinally adjacent elements 60, 62 causes the elastic body 54 to bend in an undulating configuration with the upper ends of the fingers near the high points of the undulations engaging the friction material 50 of the follower 32 while the fingers at lower points are disengaged from the friction material 50. As the charge on one layer of elements is being reversed, that on the other layer builds to a peak and the high points of the undulations are moved longitudinally by the half length displacement of the ceramic elements 60, 62, transferring contact with the friction material 50 to other fingers 66 of the elastic body 54.

Figure 3:
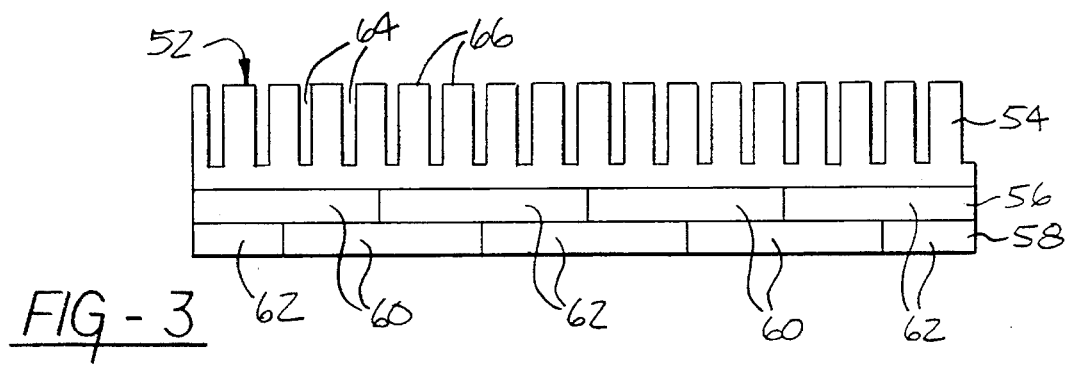
FIGS. 3–5 are schematic views illustrating the operation of an ultrasonic linear motor.
Figure 4:
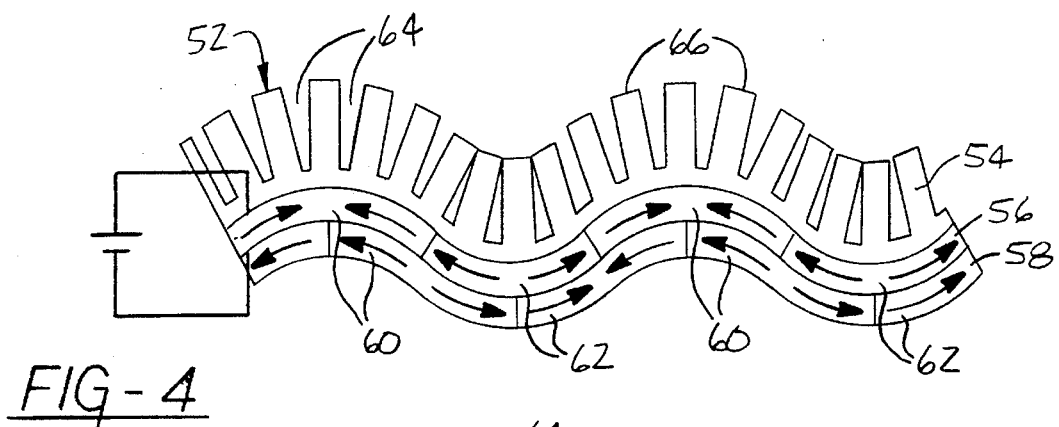
Figure 5:
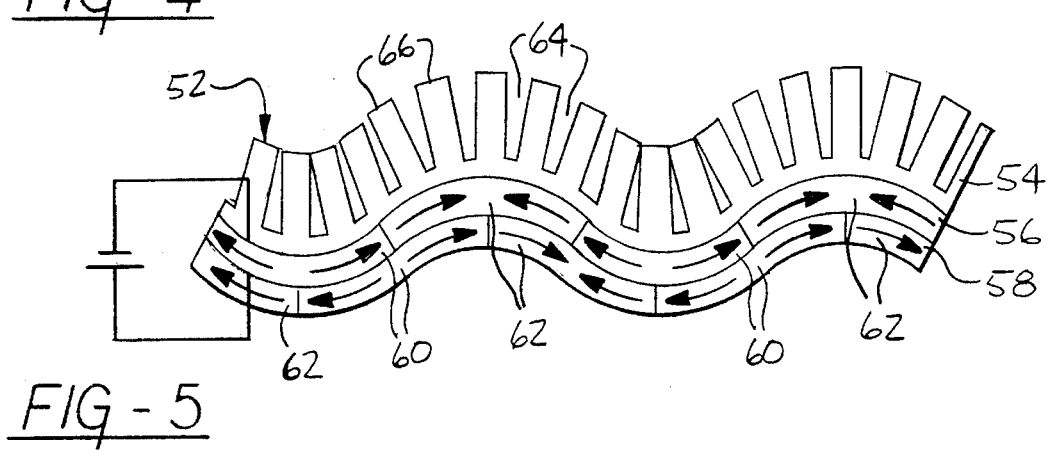

The operating concepts are illustrated schematically in FIGS. 3–5. In FIG. 3, the ceramic elements are not charged and the motor is at rest. In FIG. 4, the first layer 56 of elements is positively charged, causing the elements 60 to contract and the elements 62 to elongate. This causes the elastic metal body 54 to be deformed into an undulating configuration as is schematically shown. The high points of the undulations lie above the centers of the contracted elements 60. The second layer 58 of elements is not charged at this time since it is changing from positive to negative polarity.

FIG. 5 illustrates the condition in which the first layer 56 of elements is negatively charged and the second layer 58 is changing polarity. Note that the undulations have moved such that the high points now lie opposite the elements 62 which are contracted while the elements 60 are elongated. Between the two illustrated operating conditions, the second layer 58 of elements is alternately positively and negatively charged.

The continuing application of alternating voltages as described results in traveling waves of undulations which cause the ends of the fingers 66 to move in elliptical orbits with the higher portions of their paths moving in a direction opposite to the direction of the wave. Thus, the engagement of the fingers 66 in the high points of the undulations with the friction material 50 causes the follower 32 to be moved longitudinally in a path parallel to the axis 28 in a direction opposite to that of the waves generated in the body 54 by the alternating voltages. The direction of motion is, therefore, reversible by reversing the phases of the applied voltages. Also, the use of ultrasonic frequencies causes the vibration of the body 54 to be above the audible range and results in a quiet operating system. In effect, the operation of the linear motor is similar to that of known rotary ultrasonic motors and is thus operable by similar control systems. However, the linear arrangement of the parts of the motor allows simple and direct drive of the follower in a path parallel with the illumination axis 28.

Longitudinal motion of the follower 32 directly moves the light source, flash tube 18, forward or back along the axis 28 while the reflector 16 remains stationary. This changes the illumination angle 30 of the light emitted from the reflector. These changes may be correlated with the zoom action of the lens of the camera 10 in known manner if desired.

Although the invention has been described by reference to a specific embodiment, it should be understood that numerous changes may be made within the spirit and scope of the inventive concepts described. For example, a stationary wave linear motor could be provided similar to stationary wave rotary motors which use only a single layer of piezoelectric ceramic elements. Other types of linear motors could also be employed. Accordingly, it is intended that the invention not be limited to the described embodiment, but that it have the full scope defined by the language of the following claims.

Parts List 10. camera
12. case
14. flash
16. reflector
18. flash tube
20. flat sides
22. flat sides
24. slots
26. sockets
28. optical axis
30. illumination angle
32. follower (holder)
34. arms
36. flash holder body
38. flat top
40. flat bottom
42. roller
44. fork
46. spring
48. linear motor
50. friction material
52. stator
54. elastic body
56. first layer
58. second layer
60. ceramic elements
62. inverted elements
64. grooves
66. fingers

What is claimed is:

1. A variable angle flash apparatus for a photographic camera comprising a light source member and a reflector member which are relatively movable along an optical axis for focusing light from said source with a desired illumination angle and means for varying the distance along said axis between said light source and said reflector for changing said illumination angle, is characterized in that:

said means for varying the distance between said light source and said reflector includes a follower connected with one of said light source and reflector members, said follower being movable along a linear path parallel with said optical axis for moving said one member relative to the other member along said axis, said follower being connected with a movable part of a linear motor having a second part fixed with respect to said other of the light source and reflector members, said linear motor being operative when energized to move said follower along said linear path, thereby varying the distance between the light source and reflector members and changing the illumination angle of the flash.

2. The apparatus recited as in claim 1 wherein:

said linear motor includes at least one row of alternately inverted piezo-electric actuating elements bonded to an elastic body.

3. The apparatus recited in claim 2 wherein:

said motor includes two vertically stacked longitudinally offset layers of longitudinally aligned edge adjacent piezo-electric ceramic elements, said elements lying longitudinally parallel to said linear path.

4. The apparatus recited in claim 1 wherein: said follower is a holder carrying said one of the light source and reflector members.

5. The apparatus recited as in claim 4 wherein:

said light source member comprises an axial tube, and;

said reflector member is trough-shaped around the axis of the tube and has ends generally normal to the tube axis, said ends having slots parallel with said linear path and permitting relative motion of said light source and reflector members.

6. The apparatus as recited in claim 5 wherein:

said one of the light source and reflector members is said light source member; and said holder is connected with said light source member through said slots.

7. The apparatus as recited in claim 6 wherein:

said holder is integral with said movable part of the linear motor.

8. The apparatus as recited in claim 6 wherein:

said linear motor includes at least one row of alternately inverted piezo-electric actuating elements bonded to an elastic body, said piezo-electric actuating elements being in said part of the linear motor that is fixed with respect to said reflector member.

9. The apparatus as recited in claim 8 further characterized in that:

said motor includes two vertically stacked longitudinally offset layers of longitudinally aligned edge adjacent piezo-electric ceramic elements, said elements lying longitudinally parallel to said linear path.

* * * * *